United States Patent [19]
Amjad et al.

[11] Patent Number: 4,784,774

[45] Date of Patent: Nov. 15, 1988

[54] COMPOSITIONS CONTAINING PHOSPHONOALKANE CARBOXYLIC ACID FOR SCALE INHIBITION

[75] Inventors: Zahid Amjad, Avon Lake; William F. Masler, III, Hinckley, both of Ohio

[73] Assignee: The B. F. Goodrich Company, Akron, Ohio

[21] Appl. No.: 105,933

[22] Filed: Oct. 8, 1987

[51] Int. Cl.$^4$ ............................................. C02F 5/14
[52] U.S. Cl. ..................................... 210/699; 210/701; 252/180
[58] Field of Search .................. 252/180; 210/699, 701

[56] References Cited

U.S. PATENT DOCUMENTS

| | | | |
|---|---|---|---|
| 4,432,879 | 2/1984 | Greaves et al. | 252/180 |
| 4,532,048 | 7/1985 | Amjad et al. | 252/180 |
| 4,575,425 | 3/1986 | Boffardi et al. | 252/180 |
| 4,576,722 | 3/1986 | Gaylor et al. | 252/180 |
| 4,600,524 | 7/1986 | Cuisia et al. | 252/180 |
| 4,640,793 | 2/1987 | Persinski et al. | 252/180 |
| 4,652,377 | 3/1987 | Amjad | 252/180 |
| 4,711,725 | 12/1987 | Amick et al. | 210/701 |

FOREIGN PATENT DOCUMENTS 1117395  2/1982  Canada ............................ 252/180

*Primary Examiner*—Robert Wax
*Attorney, Agent, or Firm*—George A. Kap

[57] ABSTRACT

An antiscalant admixture is disclosed of a homopolymer of maleic acid or a copolymer and a phosphonoalkane carboxylic acid for reducing scaling in an aqueous system wherein the weight ratio of said copolymer to said phosphonic acid is 5:1 to 1:5, wherein molecular weight of said copolymer is 2,000 to 20,000, and wherein said polymer is composed of at least two of the comonomers selected from monounsaturated monocarboxylic and dicarboxylic acids of 3 to 5 carbon atoms, water-soluble salts thereof, and alkyl esters thereof of 1 to 6 carbon atoms in said alkyl groups; substituted acrylamides; acrylamidoalkane sulfonic acids and water-soluble salts thereof; vinyl sulfonic acid and water-soluble salts thereof; hydroxyalkyl acrylates with 2 to 4 carbons in the alkylene group; styrene sulfonic acids and water-soluble salts thereof; allyloxyhydroxyalkane sulfonic acids and water-soluble salts; vinyl carboxylates; polymerized vinyl alcohols and water-soluble salts thereof; and mixtures of such comonomers.

16 Claims, No Drawings

COMPOSITIONS CONTAINING PHOSPHONOALKANE CARBOXYLIC ACID FOR SCALE INHIBITION

BACKGROUND OF THE INVENTION

This invention relates to the use of compositions or admixtures containing a polymer and a phosphonoalkane carboxylic acid in aqueous media for inhibition of scales of alkaline earth metals and anions selected from sulfate, carbonate, bicarbonate, phosphate, fluoride, and hydroxide. In the preferred embodiment, the alkaline earth metals contemplated herein in the context of scale inhibition include calcium, barium, and magnesium. Particular scales contemplated herein include, but are not limited to, calcium carbonate, calcium sulfate, calcium phosphate, calcium fluoride, calcium oxalate, barium sulfate, and magnesium-containing scales.

Most industrial waters contain alkaline earth metal cations, such as calcium, barium, magnesium, etc., and several anions such as bicarbonate, carbonate, sulfate, hydroxide, phosphate, silicate, fluoride, etc. When combinations of these anions and cations are present in concentrations which exceed the solubility of their reaction products, precipitates form until these product solubility concentrations are no longer exceeded.

For example, when the concentrations of calcium ion and carbonate ion exceed the solubility of the calcium carbonate reaction products, a solid phase of calcium carbonate will form.

Solubility product concentrations are exceeded for various reasons, such as partial evaporation of the water phase, change in pH, pressure or temperature, and the introduction of additional ions which form insoluble compounds with the ions already present in the solution.

As these reaction products precipitate on surfaces of the water carrying system, they form scale or deposits. This accumulation prevents effective heat transfer, interferes with fluid flow, facilitates corrosive processes, and harbors bacteria. This scale is an expensive problem in many industrial water systems causing delays and shutdowns for cleaning and removal.

U.S. Pat. No. 4,575,425 is directed to a method for inhibiting precipitation and deposition of calcium oxalate scale in an aqueous system by the use of (a) a compound selected from water-soluble phosphates, phosphonates, and phosphinates, and amino tri(methylene phosphonic acid), and (b) a polyelectrolyte selected from, inter alia, copolymers of acrylic acid and 2-acrylamido-2methylpropane sulfonic acid. A specific example of a phosphonate is 2-phosphonobutane-1,2,4-tricarboxylic acid.

U.S. Pat. No. 4,640,793 discloses an admixture for inhibiting formation of scale forming salts and for inhibiting corrosion of a metal in an aqueous system comprising (a) a polymer of acrylic acid and 2-acrylamido-2-methylpropane sulfonic acid and (b) a compound selected from polycarboxylates, phosphonates, phosphates, polyphosphates, metal salts and sulfonates thereof. A specific example given of a phosphonate is 2-phosphonobutane-1,2,4-tricarboxylic acid.

A companion case for both inventors is being filed on the same date as this case. The companion case is entitled "Stabilization of Metal Ions and Dispersions of Particulates in Aqueous Systems" and covers the use of a copolymer and a phosphorus compound to stabilize metal ions and/or disperse particulates in an aqueous system. The copolymer contains polymerized acrylic acid and the phosphorus containing compound is selected from phosphonates and polyphosphates.

SUMMARY OF THE INVENTION

Scale forming compounds can be inhibited or can be prevented from precipitating in an aqueous system by adding to the aqueous system an effective threshhold inhibition amount of the scale-inhibiting synergistic admixture which consists essentially of a homopolymer of maleic acid or a copolymer and a phosphonoalkane carboxylic acid (PCA). The scale-inhibiting composition is added in amount of 0.1 to 200 ppm, preferably 0.5 to 10 ppm. Weight ratio of the homopolymer or copolymer to PCA is generally in the range of 10:1 to 1:10, but preferably 5:1 to 1:5.

DETAILED DESCRIPTION OF THE INVENTION

This invention pertains to scale-inhibiting admixtures containing a homopolymer of maleic acid or a copolymer of a monounsaturated monocarboxylic or dicarboxylic acid or salt thereof containing 3 to 5 carbon atoms and a phosphonoalkane carboxylic acid (PCA). In a preferred embodiment, the acid or its water-soluble salt is a monounsaturated monocarboxylic acid of 3 to 5 carbon atoms, especially acrylic acid, that is polymerized with one or more comonomers selected from other monounsaturated monocarboxylic and dicarboxylic acids of 3 to 5 carbon atoms; esters of the monounsaturated monocarboxylic and dicarboxylic acids of 3 to 5 carbon atoms; substituted acrylamides; vinyl acetate and other vinyl esters; hydroxyalkyl acrylates such as hydroxyethyl and hydroxypropyl acrylates; and alkoxyalkyl acrylates, particularly 2-(ethoxyethoxy)ethylacrylate; polymerized vinyl alcohols; acrylamidoalkane sulfonic acids; and salts of such acids.

Stated differently, the copolymerizable monomers suitable herein are selected from monounsaturated monocarboxylic and dicarboxylic acids of 3 to 5 carbons and salts thereof, esters of such acid monomers, substituted acrylamides, alkyl acrylates, vinyl sulfonic acid and salts thereof, hydroxyalkyl acrylates, alkoxyalkyl acrylates, styrene sulfonic acids and salts thereof, allyloxy hydroxyalkane sulfonic acids and salts thereof, acrylamidoalkane sulfonic acids and salts thereof, vinyl carboxylates, and hydrolyzed vinyl carboxylates.

Suitable copolymers contain at least 30% by weight of the monounsaturated carboxylic acid, preferably 50 to 90 weight percent, such as acrylic acid, with remainder to 100 weight percent being one, two or more copolymerizable comonomers. To be suitable, the resulting copolymers must be soluble in water at least to the extent used. In the case where an acrylamidoalkane sulfonic acid or a salt thereof is used as a comonomer, such copolymers contain at least two different comonomers, which means that overall, there are at least three comonomers in the copolymer. Copolymers suitable herein have weight average molecular weight of 1,000 to 50,000 but preferably 2,000 to 20,000. Amount of the admixture or composition added to an aqueous medium is 0.1 to 200, preferably 0.5 to 10 ppm, and the weight ratio of the copolymer to the phosphonoalkane carboxylic acid is 10:1 to 1:10, preferably 5:1 to 1:5.

The monounsaturated carboxylic acids include acrylic acid, methacrylic acid, itaconic acid, maleic acid, citraconic acid, and mesaconic acid, with preferred acids being acrylic, methacrylic, maleic, and itaconic acids. Suitable esters of the monounsaturated carboxylic acids include alkyl esters containing 1 to 6, preferably 1 to 4 carbon atoms in each alkyl group; monounsaturated alkyl esters where the alkyl chain is substituted with carboxy, sulfo, and keto groups. Specific examples of such suitable esters include dimethyl itaconate, diethyl itaconate, carboxyethyl acrylate, sulfoethyl acrylate, sulfopropyl acrylate, bis(sulfopropyl)itaconate, and sulfopropyl methacrylate.

Repeating units of substituted acrylamides are defined as follows:

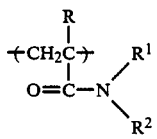

where R is hydrogen or methyl and $R^1$ and $R^2$ are individually selected from hydrogen, alkyl and substituted alkyl groups each containing a total of 1 to 12, preferably 1 to 8 carbons. Preferred acrylamides are the substituted acrylamides where $R^1$ and $R^2$ are both not hydrogens. Substituents on the alkyl groups include alkyl, aryl, hydroxyl, hydroxyalkyl, carboxylic acid, and keto groups. Specific examples of substituted acrylamides include t-butyl acrylamide, isopropyl acrylamide, isobutyl acrylamide, methyl acrylamide, t-butyl methacrylamide, 2-(2,4,4-trimethyl pentyl)acrylamide, (2-(2-methyl-4-oxopentyl)acrylamide, hydroxymethyl acrylamide, hydroxypropyl acrylamide, diacetone acrylamide, and 3-acrylamido-3-methyl butanoic acid.

Repeating units of the alkyl acrylates are defined as follows:

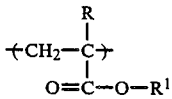

where R is hydrogen or methyl and $R^1$ is an alkyl radical of 1 to 6, preferably 1 to 4 carbon atoms. $R^1$ is selected from alkyl groups of 1 to 6 carbons or substituted alkyl groups where $R^1$ is defined as $R^2$—Y, and $R^2$ is an alkyl group containing from 1 to 6 carbon atoms and Y is —SO$_3$X, —C(O)R$^3$, or —CO$_2$X where X is hydrogen, alkali metal, alkaline earth metal, or ammonium, and $R^3$ is alkyl of 1 to 3 carbon atoms. In a preferred embodiment, the $R^1$ group is unsubstituted. Specific examples of suitable monomeric alkyl acrylates and methacrylates include ethyl acrylate, ethyl methacrylate, sulfoethyl methacrylate, sulfopropyl acrylate, and carboxethyl acrylate.

Repeating units of vinyl sulfonic acid is defined as follows:

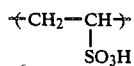

Included herein are also water-soluble salts of vinyl sulfonic acid wherein the hydrogen of the SO$_3$H group is replaced with an alkali metal, alkaline earth metal, or an ammonium group, preferably an alkali metal or ammonium group.

Repeating units of polymerized hydroxyalkyl acrylates are defined as follows:

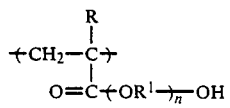

where R is hydrogen or methyl; and $R^1$ is selected from lower alkylene groups of 2 to 4, preferably 2 to 3 carbons; and n is an integer from 1 to 5. Some specific examples of suitable hydroxyalkyl acrylates include hydroxypropyl acrylate and hydroxypropyl methacrylate.

Repeating units of the alkoxyalkyl acrylates are defined as follows:

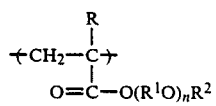

where R is hydrogen or methyl, $R^1$ is alkylene containing from 2 to 4, preferably 2 to 3 carbon atoms, n is an integer from 1 to 5, preferably 1 to 3, and $R^2$ is an alkyl group containing from 1 to 10, preferably 1 to 4 carbon atoms. Specific examples of alkoxyalkyl acrylate monomers include methoxyethyl acrylate, cellosolve methacrylate, and 2-(2-ethoxyethoxy)ethyl acrylate.

Repeating units of styrene sulfonic acids and salts thereof are defined as follows:

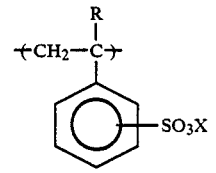

where R is hydrogen or a lower alkyl group of 1 to 6 carbon atoms, preferably hydrogen, and X is alkali metal or alkaline earth metal or ammonium, particularly hydrogen, ammonium or alkali metal. A particularly suitable sulfonic acid is styrene sulfonic acid where R is hydrogen and the —SO$_3$X group is at the 3 or 4 position on the phenyl ring. The salts of styrene sulfonic acids are water-soluble. The sodium salt of styrene sulfonic acid is available chemically.

Repeating units of the allyloxy hydroxyalkane sulfonic acids and salts thereof are defined as follows:

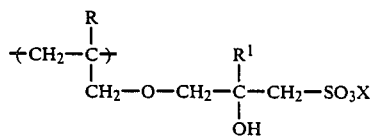

where R and $R^1$ are each hydrogen or methyl, and X is selected from hydrogen, alkali metal, alkaline earth metal and ammonium groups.

Repeating units of suitable acrylamidoalkane sulfonic acids and salts thereof have the general formula

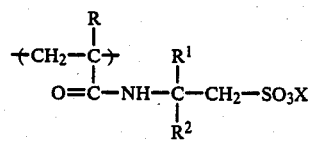

where R can be hydrogen or methyl; X is selected from hydrogen, ammonium, alkali metals or alkaline earth metals, particularly hydrogen, ammonium, or an alkali metal; and $R^1$ and $R^2$ are individually selected from hydrogen and alkyl groups of 1 to 4 carbon atoms. In a preferred embodiment, R is hydrogen, $R^1$ and $R^2$ are each an alkyl group of 1 to 3 carbon atoms. The letter X in the above structural formula represents hydrogen or any metal cation which does not adversely affect the water solubility of the polymer, such as sodium, potassium and ammonium cations. In addition, X may also represent calcium, magnesium, and lithium, since they do not present any adverse effects on the solubility of the polymer. The acrylamidoalkane sulfonic acid monomer which has been found to be particularly suitable in accordance with the present invention is 2-acrylamido-2-methylpropane sulfonic acid, or a salt thereof, which has the following structural formula:

$$CH_2=CH-\overset{\overset{\displaystyle O}{\|}}{C}-NH-\overset{\overset{\displaystyle CH_3}{|}}{\underset{\underset{\displaystyle CH_3}{|}}{C}}-CH_2SO_3H$$

The vinyl carboxylate repeating units in the copolymers are defined as follows:

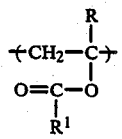

where R is hydrogen or a lower alkyl group of 1 to 6 carbon atoms, preferably 1 to 4, and $R^1$ is selected from alkyl groups of 1 to 12 carbon atoms, preferably 1 to 8. The vinyl carboxylates, in polymerized form, can be hydrolyzed to contain polymerized vinyl alcohol repeating units of the following structure:

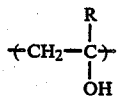

where R is hydrogen or a lower alkyl group of 1 to 6 carbon atoms, preferably 1 to 4. The R group of the hydrolyzed carboxylates corresponds to the R group on the vinyl carboxylates. Specific examples of vinyl carboxylates include vinyl acetate, vinyl propionate, and 2-propenyl acetate.

The monomers can be prepared, if desired, in a conventional manner but they are commercially available and, therefore, can be purchased. Polymerization of the monomers results in an essentially non-crosslinked random copolymer, the molecular weight of which can be adjusted with a little trial and error. The copolymer is preferably formed in a high yield ranging from about 50% to about 99% by weight of the comonomers.

It is also a requirement that the copolymer be soluble in water. Typically, the copolymer is used in water in the range of 0.5 to 500 ppm. Thus, high solubility of water treatment compositions is not essential but desirable. The product is preferably shipped in drums as a concentrated aqueous solution containing in the range of about 20% to about 50% by weight of solids per 100 parts of solution, which requires solubility to the extent of at least 20 weight parts per 100 parts of water.

Polymerization of the monomers identified herein can be carried out in a mutual solvent for both, such as in a lower alkanol of about 1 to 6 carbon atoms, or in water, with an effective amount of a free radical initiator sufficient to produce the desired composition within an acceptable period of time. The monomeric acids can be used as such or can be in a partially or a completely neutralized form prior to polymerization.

The reaction is conveniently carried out in water as the only reaction medium at a temperature in the range of about 30° to about 130° C. usually at atmospheric or slightly elevated pressure. The concentration of the copolymer formed may range from about 5% to about 50% by weight, based on total solids, which solution can be shipped directly.

The copolymers suitable herein have weight average molecular weight in the range of about 1,000 to about 50,000, and preferably about 2,000 to abut 20,000, as determined by gel permeation chromatography. This determination is conventionally made according to ASTM method D-3536-76 (see ASTM Standards, Part 35, 1980), by dissolving the esterified copolymer in tetrahydrofuran and comparing with a solution in THF of polystyrene of known molecular weight. The acid numbers of the copolymers formed, as detemined by a conventional titration with KOH, may range from about 230 to about 740, corresponding to a weight fraction of from 30% to about 95% by weight of monomer units having COOH groups. The preferred polymers have more than 50% by weight of free carboxyl groups and an acid number in the range of about 390 to about 700.

The copolymers described herein in connection with threshold inhibition of salt-forming scales, can be used in combination with other conventional additives wherever appropriate. Examples of some of the conventional additives include precipitating agents, oxygen scavengers, sequestering agents, corrosion inhibitors, antifoaming agents, and the like.

The homopolymer or the copolymer can be mixed with a phosphonocarboxylic acid and the resulting mixture can then be added to an aqueous system to inhibit or to prevent precipitation of scale. Alternatively, the ingredients can be added separately.

The phosphonocarboxylic acid is defined by the following formulas (A) and (B):

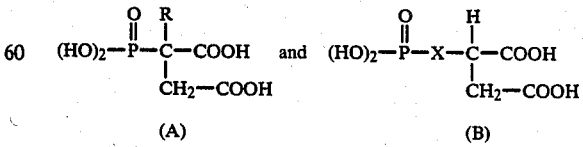

where R is hydrogen, alkyl, alkenyl, or alkynyl radical having 1 to 4 carbon atoms, an aryl, cycloalkyl, or aralkyl radical, or the radical selected from the following:

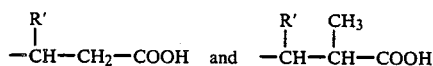

where R' is hydrogen, alkyl radical of 1 to 4 carbon atoms, or a carboxyl radical; and X is selected from the following:

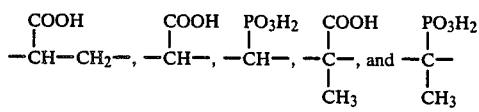

where the —PO$_3$H$_2$ group is the phosphono group

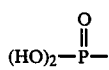

Illustrative of specific phosphonocarboxylic acids include α-methylphoshonosuccinic acid, phosphonosuccinic acid, 1-phosphonopropane-2,3-dicarboxylic acid, 2-phosphonobutane-1,2,4-tricarboxylic acid, α-allyl-phosphonosuccinic acid, α-p-chlorophenylphosphonosuccinic acid, α-propargyl-phosphonosuccinic acid, α-benzyl-phosphonosuccinic acid, α-cyclohexyl-phoshonosuccinic acid, 2-phosphono-3-(α-methyl-carboxymethyl-hexane-1,2,4-tricarboxylic acid, 2,2-diphosono-butane-4-dicarboxylic acid, and the like. The preferred phosphonocarboxylic acid is 2-phosphonobutane-1,2,4-tricarboxylic acid.

The phosphonocarboxylic acids, which are also referred to herein as phosphonoalkane carboxylic acids and phosphono loweralkane carboxylic acids, contain at least one and preferably one or two phosphono groups

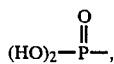

at least two and preferably two or three carboxylic acid groups, with the main hydrocarbon chain containing at least 2 and preferably 2 to 6 carbon atoms with substituents on the chain selected from alkyl, alkenyl, alkynyl, aryl, aralkyl, and carboxylic and halogenated versions thereof.

The compositions described herein can be used to treat water which contains calcium ions and sulfate ions. The threshold tests for calcium sulfate inhibition were carried out as follows:

Supersaturated solutions of 6,220 ppm CaSO$_4$ and the indicated amount of the inhibitor were prepared. Solutions were then stored in capped four-ounce jars and placed in a 66° C. oven without agitation. After 24 hours, solutions were filtered through 0.22 micrometer filter paper and calcium analyzed by EDTA titrations.

The percent threshold inhibition (TI) attained for each experiment is obtained using the following formula:

$$\% \text{ TI} = \frac{(Ca) \text{ exp} - (Ca) \text{ final}}{(Ca) \text{ initial} - (Ca) \text{ final}} \times 100$$

where
(Ca) exp = concentration of calcium ions in the filtrate in presence of the polymer at time 24 hours;
(Ca) final = concentration of calcium ions in filtrate in absence of the polymer at time 24 hours;
(Ca) initial = concentration of calcium ions at time zero.

EXAMPLE 1

This example demonstrates effectiveness of the inventive admixtures as scale inhibitors against calcium sulfate scale. The monomer ratio of the polymer is given in weight parts, molecular weight of the polymer is given in weight average molecular weight, and the dosage of the polymer and the phosphonoalkane carboxylic acid (PCA) is given in parts per million (ppm). Percent threshhold inhibition is given as % TI. The following contractions appear herein:

AA = acrylic acid
PAA = polyacrylic acid
MAA = methacrylic acid
IA = itaconic acid
DMI = dimethyl itaconate
DEI = diethyl itaconate
MeOEA = methoxyethyl acrylate
CMA = Cellosolve ® methacrylate
EOTGA = ethoxytriglycol acrylate
CA = carbitol acrylate
DAAm = diacetone acrylamide
t-BuAm = tertiary butyl acrylamide
AMPS = 2-acrylamido-2-methylpropane sulfonic acid
HPA = hydroxypropyl acrylate
SEM = sulfoethyl methacrylate
SPA = sulfopropyl acrylate
SPI = bis-3-sulfopropyl itaconate
SPM = sulfopropyl methacrylamide
VOAc = vinyl acetate
VOH = vinyl alcohol
PCA = 2-phosphonobutane-1,2,4-tricarboxylic acid
PMA = polymaleic acid
NA = not applicable Threshhold inhibition tests on calcium sulfate scale were carried out in the manner described above and results thereof, in terms of percent threshhold inhibition, are given in Table A, below:

TABLE A

| Exp. No. | Polymer Composition | Monomer Ratio | Mol. Wt. | Dosage polymer(ppm) | PCA(ppm) | % Inhibition Actual | Expected | Synergism |
|---|---|---|---|---|---|---|---|---|
| 1 | None | — | — | 0 | 0.5 | 5 | 5 | NA |
| 2 | None | — | — | 0 | 1.0 | 14 | 14 | NA |
| 3 | None | — | — | 0 | 1.5 | 22 | 22 | NA |
| 4 | None | — | — | 0 | 2.0 | 50 | 50 | NA |
| 5 | AA:IA | 50:50 | 5,000 | 1 | 0 | 2 | 2 | NA |
| 6 | AA:IA | 50:50 | 5,000 | 2 | 0 | 27 | 27 | NA |
| 7 | AA:IA | 50:50 | 5,000 | 1 | 1 | 68 | 16 | +52 |
| 8 | AA:DMI | 80:20 | 10,000 | 1 | 0 | 18 | 18 | NA |
| 9 | AA:DMI | 80:20 | 10,000 | 2 | 0 | 53 | 53 | NA |
| 10 | AA:DMI | 80:20 | 10,000 | 1 | 1 | 98 | 32 | +66 |
| 11 | AA:DEI | 70:30 | 10,000 | 1 | 0 | 16 | 16 | NA |

TABLE A-continued

| Exp. No. | Polymer Composition | Monomer Ratio | Mol. Wt. | Dosage polymer(ppm) | PCA(ppm) | % Inhibition Actual | Expected | Synergism |
|---|---|---|---|---|---|---|---|---|
| 12 | AA:DEI | 70:30 | 10,000 | 2 | 0 | 41 | 41 | NA |
| 13 | AA:DEI | 70:30 | 10,000 | 1 | 1 | 99 | 30 | +69 |
| 14 | AA:SEM | 80:20 | 10,000 | 1 | 0 | 18 | 18 | NA |
| 15 | AA:SEM | 80:20 | 10,000 | 2 | 0 | 57 | 57 | NA |
| 16 | AA:SEM | 80:20 | 10,000 | 1 | 1 | 98 | 32 | +66 |
| 17 | AA:SPI | 80:20 | 5,000 | 1 | 0 | 18 | 18 | NA |
| 18 | AA:SPI | 80:20 | 5,000 | 2 | 0 | 57 | 57 | NA |
| 19 | AA:SPI | 80:20 | 5,000 | 1 | 1 | 96 | 32 | +64 |
| 20 | AA:MeOEA | 80:20 | 6,000 | 1 | 0 | 20 | 20 | NA |
| 21 | AA:MeOEA | 80:20 | 6,000 | 2 | 0 | 76 | 76 | NA |
| 22 | AA:MeOEA | 80:20 | 6,000 | 1 | 1 | 98 | 34 | +64 |
| 23 | AA:MAA:CA | 60:20:20 | 10,000 | 1 | 0 | 17 | 17 | NA |
| 24 | AA:MAA:CA | 60:20:20 | 10,000 | 2 | 0 | 48 | 48 | NA |
| 25 | AA:MAA:CA | 60:20:20 | 10,000 | 1 | 1 | 98 | 31 | +67 |
| 26 | AA:AMPS:DAAm | 60:20:20 | 10,000 | 1 | 0 | 16 | 16 | NA |
| 27 | AA:AMPS:DAAm | 60:20:20 | 10,000 | 2 | 0 | 41 | 41 | NA |
| 28 | AA:AMPS:DAAm | 60:20:20 | 10,000 | 1 | 1 | 84 | 30 | +54 |
| 29 | AA:AMPS:VOAc | 60:20:20 | 10,000 | 1 | 0 | 17 | 17 | NA |
| 30 | AA:AMPS:VOAc | 60:20:20 | 10,000 | 2 | 0 | 67 | 67 | NA |
| 31 | AA:AMPS:VOAc | 60:20:20 | 10,000 | 1 | 1 | 96 | 31 | +65 |
| 32 | AA:MAAP:t-BuAm:AMPS | 30:20:20:30 | 10,000 | 1 | 0 | 8 | 8 | NA |
| 33 | AA:MAA:t-BuAm:AMPS | 30:20:20:30 | 10,000 | 2 | 0 | 18 | 18 | NA |
| 34 | AA:MAA:t-BuAm:AMPS | 30:20:20:30 | 10,000 | 1 | 1 | 64 | 22 | +42 |
| 35 | AA:VOH:AMPS | 60:20:20 | 10,000 | 1 | 0 | 17 | 17 | NA |
| 36 | AA:VOH:AMPS | 60:20:20 | 10,000 | 2 | 0 | 38 | 38 | NA |
| 37 | AA:VOH:AMPS | 60:20:20 | 10,000 | 1 | 1 | 98 | 31 | +67 |
| 38 | AA:HPA:AMPS | 60:5:35 | 10,000 | 1 | 0 | 14 | 14 | NA |
| 39 | AA:HPA:AMPS | 60:5:35 | 10,000 | 2 | 0 | 35 | 35 | NA |
| 40 | AA:HPA:AMPS | 60:5:35 | 10,000 | 1 | 1 | 95 | 28 | +67 |
| 41 | AA:AMPS:CMA | 60:20:20 | 10,000 | 1 | 0 | 14 | 14 | NA |
| 42 | AA:AMPS:CMA | 60:20:20 | 10,000 | 2 | 0 | 39 | 39 | NA |
| 43 | AA:AMPS:CMA | 60:20:20 | 10,000 | 1 | 1 | 86 | 28 | +58 |
| 44 | AA:AMPS:t-BuAm | 60:20:20 | 10,000 | 0.5 | 0 | 9 | 9 | NA |
| 45 | AA:AMPS:t-BuAm | 60:20:20 | 10,000 | 1.0 | 0 | 17 | 17 | NA |
| 46 | AA:AMPS:t-BuAm | 60:20:20 | 10,000 | 1.5 | 0 | 26 | 26 | NA |
| 47 | AA:AMPS:t-BuAm | 60:20:20 | 10,000 | 2.0 | 0 | 36 | 36 | NA |
| 48 | AA:AMPS:t-BuAm | 60:20:20 | 10,000 | 0.5 | 1.5 | 76 | 31 | +45 |
| 49 | AA:AMPS:t-BuAm | 60:20:20 | 10,000 | 1 | 1 | 74 | 31 | +43 |
| 50 | AA:AMPS:t-BuAm | 60:20:20 | 10,000 | 1.5 | 1.5 | 98 | 48 | +50 |
| 51 | AA:AMPS:t-BuAm | 60:20:20 | 10,000 | 2.0 | 1.0 | 99 | 50 | +49 |
| 52 | AA:AMPS:t-BuAm | 60:20:20 | 10,000 | 1.0 | 2.0 | 99 | 67 | +32 |
| 53 | PMA | 100 | — | 1.0 | 0 | 35 | 35 | NA |
| 54 | PMA | 100 | — | 1.0 | 1.0 | 92 | 49 | +43 |

In the above Table A, at a level of 1.0 ppm of a 50:50 copolymer of acrylic acid and itaconic acid above, inhibition of calcium sulfate was 2% whereas at 1.0 ppm of PCA above, inhibition of calcium sulfate was 14%. However, at a level of 1.0 ppm of the copolymer and 1.0 ppm of PCA, inhibition of calcium sulfate was 68%, which is 52 points above the expected inhibition of each component above, i.e., 2% + 14% = 16%. Same reasoning applies to the other tested compositions.

We claim:

1. An admixture useful for inhibiting formation of scale-forming salts in an aqueous medium comprising at least one copolymer having weight average molecular weight of 1,000 to 50,000 and at least one phosphonoalkane carboxylic acid or a water-soluble salt thereof; wherein weight ratio of said copolymer to said phosphonoalkane carboxylic acid or its salt is 10:1 to 1:10; wherein said phosphonoalkane carboxylic acid and salts thereof contain 1 to 2 phosphono groups and 2 to 6 carbon atoms in the alkane group; wherein said copolymer consists essentially of at least one polymerized carboxyl monomer in amount of 50 to 90% by weight and at least one polymerized comonomer in amount of at least 5% by weight; wherein said carboxyl monomer is selected from acrylic acid, methacrylic acid, itaconic acid, maleic acid or its anhydride, salts of such acids, and mixtures thereof, and wherein said comonomer is selected from alkyl esters, substituted acrylamides, alkoxyalkyl acrylates, vinyl alcohol, and mixtures of such comonomers; wherein said alkyl esters are alkyl esters of itaconic acid and maleic acid containing 1 to 6 carbon atoms in each alkyl group; wherein repeating units of said substituted acrylamides are defined as follows:

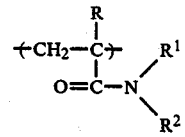

where R is hydrogen or methyl and $R^1$ and $R^2$ are individually selected from hydrogen and alkyl groups of 1 to 12 carbon atoms provided that at least $R^1$ or $R^2$ is other than hydrogen; wherein repeating units of said alkoxyalkyl acrylates are defined as follows:

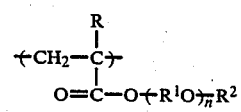

where R is hydrogen or methyl, $R^1$ is an alkylene group of 2 to 4 carbon atoms, $R^2$ is an alkyl group of 1 to 10 carbon atoms, and n is an integer of 1 to 5; and wherein repeating units of said vinyl alcohols are defined as follows:

$$+CH_2-\underset{\underset{OH}{|}}{\overset{\overset{R}{|}}{C}}+$$

where R is hydrogen or an alkyl group of 1 to 6 carbon atoms.

2. The admixture of claim 1 wherein said copolymer contains 50 to 90% of said carboxyl monomer, wherein in said alkyl esters, said alkyl group is unsubstituted and contains 1 to 4 carbon atoms; wherein in said substituted acrylamides, said alkyl groups $R^1$ and $R^2$ each contain 1 to 8 carbon atoms and are selected from unsubstituted alkyl groups and substituted alkyl groups wherein substituents are selected from alkyl, aryl, carboxylic acid, keto groups, and mixtures thereof; wherein in said alkoxyalkyl acrylates, said $R^1$ alkylene group contains 2 to 3 carbon atoms, said $R^2$ alkyl group contains 1 to 4 carbon atoms, and n is an integer of 1 to 3; and wherein in said vinyl alcohols, said R alkyl group contains 1 to 4 carbon atoms.

3. The admixture of claim 1 wherein said alkyl esters are selected from dimethyl itaconate and diethyl itaconate; said substituted acrylamides are selected from t-butyl acrylamide, isopropyl acrylamide, isobutyl acrylamide, methyl acrylamide, t-butyl methacrylamide, 2-(2,4,4-trimethyl pentyl)acrylamide, 2-(2-methyl-4-oxolpentyl)acrylamide, diacetone acrylamide, and 3-acrylamido-3-methyl butanoic acid; said alkoxyallkyl acrylates are selected from methoxyethyl acrylate, cellosolve methacrylate, and 2-(2-ethoxyethoxy)ethyl acrylate; and said vinyl alcohol is selected from vinyl alcohol wherein said R group is hydrogen.

4. The admixture of claim 3 wherein weight ratio of said copolymer to said phosphonoalkane carboxylic acid or its salt is 5:1 or 1:5.

5. The admixture of claim 4 wherein said phosphonocarboxylic acid is 2-phosphonobutane-1,2,4-tricarboxylic acid.

6. The admixture of claim 5 wherein molecular weight of said copolymer is in the range of 2,000 to 20,000.

7. An admixture useful for inhibiting formation of scale-forming salts in an aqueous medium comprising at least one copolymer having weight average molecular weight of 1,000 to 50,000 and at least one phosphonoalkane carboxylic acid or a water-soluble salt thereof; wherein said phosphonocarboxylic acid and salts thereof contain 1 to 2 phosphono groups and 2 to 6 carbon atoms in the alkane group; wherein weight ratio of said copolymer to said phosphonocarboxylic acid or salt thereof is 5:1 to 1:5; and wherein said copolymer is selected from the following copolymers given in weight parts:

(a) AA:IA=50:50
(b) AA:DMI=80:20
(c) AA:DEI=70:30
(d) AA:SEM=80:20
(e) AA:SPI=80:20
(f) AA:MeOEA=80:20
(g) AA:MAA:CA=60:20:20
(h) AA:AMPS:DAAm=60:20:20
(i) AA:VOAc:AMPS=60:20:20
(j) AA:VOH:AMPS=60:20:20
(k) AA:MAA:t-BUAm:AMPS=30:20:20:30
(l) AA:MAA:CA=70:10:20
(m) AA:AMPS:MAA:CA=58:5:21:16
(n) AA:AMPS:CMA=60:20:20
(o) AA:AMPS:MeOEA=60:20:20
(p) AA:HPA:AMPS=60:5:35
(q) AA:AMPS:CMA=60:20:20
(r) AA:AMPS:A-BuAm=60:20:20 where the following contractions are used:
AA—acrylic acid
AMPS—2-acrylamido-2-methylpropane sulfonic acid
CMA—Cellosolve ® methacrylate
DAAm—diacetone acrylamide
DEI—diethyl itaconate
DMI—dimethyl itaconate
HPA—hydroxypropyl acrylate
IA—itaconic acid
MAA—methacrylic acid
MeOEA—methoxyethyl acrylate
CA—carbitol acrylate
SEM—sulfoethyl methacrylate
SPI—sulfopropyl itaconate
t-BuAm—tertiarybutyl acrylamide
VOAc—vinyl acetate
VOH—vinyl alcohol.

8. Admixture of claim 7 wherein said phosphonoalkane carboxylic acid is 2-phosphonobutane-1,2,4-tricarboxylic acid.

9. Method for inhibiting precipitation of scale-forming salts, including calcium sulfate, in an aqueous medium comprising the step of adding to said aqueous medium an effective amount of at least one copolymer and at least one phosphonoalkane carboxylic acid or a water-soluble salt thereof; wherein weight ratio of said copolymer to said phosphonoalkane carobyxlic acid or its salt is 10:1 to 1:10; wherein said phosphonoalkane carboxylic acid and salts thereof contain 1 to 2 phosphono groups and 2 to 6 carbon atoms in the alkane group; wherein said copolymer is a copolymer consisting essentially of at least one polymerized carboxyl monomer in amount of 50 to 90% by weight and at least one polymerized comonomer in amount of at least 5% by weight; wherein said carboxyl monomer selected from acrylic acid, methacrylic acid, itaconic acid, maleic acid or its anhydride, salts of such acids, and mixtures thereof, and wherein said comonomer is selected from alkyl esters, substituted acrylamides, alkoxyalkyl acrylates, vinyl alcohol, and mixtures of such comonomers; wherein said alkyl esters are alkyl esters of itaconic acid and maleic acid containing 1 to 6 carbon atoms in each alkyl group; wherein repeating units of said substituted acrylamides are defined as follows:

$$+CH_2-\underset{\underset{O=C-N}{|}}{\overset{\overset{R}{|}}{C}}+\overset{R^1}{\underset{R^2}{\diagdown}}$$

where R is hydrogen or methyl and $R^1$ and $R^2$ are individually selected from hydrogen and alkyl groups of 1 to 12 carbon atoms provided that at least $R^1$ or $R^2$ is other than hydrogen; wherein repeating units of said alkoxyalkyl acrylates are defined as follows:

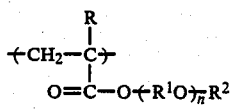

where R is hydrogen or methyl, $R^1$ is an alkylene group of 2 to 4 carbon atoms, $R^2$ is an alkyl group of 1 to 10 carbon atoms, and n is an integer of 1 to 5; and wherein repeating units of said vinyl alcohols are defined as follows:

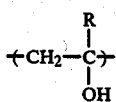

where R is hydrogen or an alkyl group of 1 to 6 carbon atoms.

10. Method of claim 9 wherein aid effective amount is 0.1 to 200 ppm; wherein in said alkyl esters, said alkyl group is unsubstituted and contains 1 to 4 carbon atoms; wherein in said substituted acrylamides, said alkyl groups $R^1$ and $R^2$ each contain 1 to 8 carbon atoms and are selected from unsubstituted alkyl groups and substituted alkyl groups wherein substituents are selected from alkyl, aryl, carboxylic acid, keto groups and mixtures thereof; wherein in said alkoxyalkyl acrylates, said $R^1$ alkylene group contains 2 to 3 carbon atoms, said $R^2$ alkyl group contains 1 to 4 carbon atoms, and n is an integer of 1 to 3; and wherein in said vinyl alcohols, said R alkyl group contains 1 to 4 carbon atoms.

11. Method of claim 9 wherein said copolymer contains 50 to 90% of said carboxyl monomer; wherein said alkyl esters are selected from dimethyl itaconate and diethyl itaconate; said substituted acrylamides are selected from t-butyl acrylamide, isopropyl acrylamide, isobutyl acrylamide, methyl acrylamide, t-butyl methacrylamide, 2-(2,4,4-trimethyl pentyl)acrylamide, 2-(2-methyl-4-oxopentyl)acrylamide, diacetone acrylamide, and 3-acrylamido-3-methyl butanoic acoid; said alkoxyalkyl acrylates are selected from methoxyethyl acrylate, cellosolve methacrylate, and 2-(2-ethoxyethoxy)ethyl acrylate; and said vinyl alcohol is selected from vinyl alcohol wherein said R group is hydrogen.

12. Method of claim 11 wherein weight ratio of said copolymer to said phosphonoalkane carboxylic acid or its salt is 5:1 or 1:5 and wherein said effective amount is 0.5 to 10 ppm.

13. Method of claim 12 wherein said phosphonocarboxylic acid is 2-phosphonobutane-1,2,4-tricarboxylic acid.

14. Method of claim 13 wherein molecular weight of said copolymer is in the range of 2,000 to 20,000.

15. Method for inhibiting precipitation of scale forming salts, including calcium sulfate, in an aqueous medium comprising the step of adding to said aqueous medium 0.5 to 10 ppm of at least one copolymer having weight average molecular weight of 1,000 to 50,000 and at least one phosphonoalkane carboxylic acid or a water-soluble salt thereof; wherein weight ratio of said copolymer to said phosphonoalkane carboxylic acid or its salt is 5:1 to 1:5; wherein said phosphonoalkane carboxylic acid and salts thereof contain 1 to 2 phosphono groups and 2 to 6 carbon atoms in the alkane group; and wherein said copolymer is selected from the following copolymers given in weight parts:
 (a) AA:IA=50:50
 (b) AA:DMI=80:20
 (c) AA:DEI=70:30
 (d) AA:SEM=80:20
 (e) AA:SPI=80:20
 (f) AA:MeOEA=80:20
 (g) AA:MAA:CA=60:20:20
 (h) AA:AMPS:DAAm=60:20:20
 (i) AA:VOAc:AMPS=60:20:20
 (j) AA:VOH:AMPS=60:20:20
 (k) AA:MAA:t-BuAm:AMPS=60:20:20
 (l) AA:MAA:CA=70:10:20
 (m) AA:AMPS:MAA:Ca=58:5:21:16
 (n) AA:AMPS:CMA=60:20:20
 (o) AA:AMPS:MeOEA=60:20:20
 (p) AA:HPA:AMPS=60:5:35
 (q) AA:AMPS:CMA=60:20:20
 (r) AA:AMPS:t-BuAm=60:20:20
where the following contractions are used:
 AA—acrylic acid
 AMPS—2-acrylamido-2-methylpropane sulfonic acid
 CMA—Cellosolve ® methacrylate
 DAAm—diacetone acrylamide
 DEI—diethyl itaconate
 DMI—dimethyl itaconate
 HPA—hydroxypropyl acrylate
 IA—itaconic acid
 MAA—methacrylic acid
 MeOEA—methoxyethyl acrylate
 CA—carbitol acrylate
 SEM—sulfoethyl methacrylate
 SPI—sulfopropyl itaconate
 t-BuAm—tertiarybutyl acrylamide
 VOAc—vinyl acetate
 VOH—vinyl alcohol.

16. Method of claim 15 wherein said phosphonoalkane carboxylic acid is 2-phosphonobutane-1,2,4-tricarboxylic acid.

* * * * *